April 14, 1970                C. H. LOOS                3,506,896
       SELF ADAPTIVE CONTROL SYSTEM WITH MEANS FOR AUTOMATICALLY
            MATCHING CONTROL SYSTEM PARAMETERS TO CHANGES
                 IN PARAMETERS OF A CONTROLLED PROCESS
                         Filed June 8, 1967
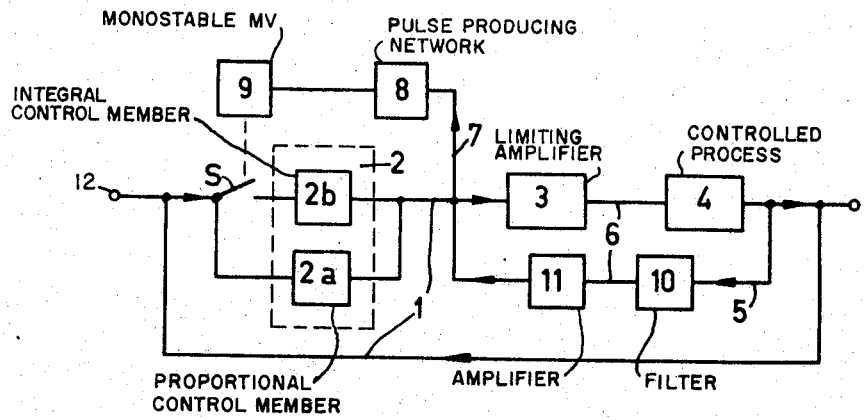
INVENTOR.
CORNELIS H. LOOS
BY
AGENT

United States Patent Office 3,506,896
Patented Apr. 14, 1970

3,506,896
SELF ADAPTIVE CONTROL SYSTEM WITH MEANS FOR AUTOMATICALLY MATCHING CONTROL SYSTEM PARAMETERS TO CHANGES IN PARAMETERS OF A CONTROLLED PROCESS
Cornelis Henricus Loos, Emmasingel, Eindhoven, Netherlands, assignor, by mesne assignments, to U.S. Philips Corporation, New York, N.Y., a corporation of Delaware
Filed June 8, 1967, Ser. No. 644,542
Claims priority, application Netherlands, June 23, 1966, 6608702
Int. Cl. G05b 15/02
U.S. Cl. 318—18                                        8 Claims

ABSTRACT OF THE DISCLOSURE

A self-adaptive control system includes a self-oscillating auxiliary loop in which the amplitude and frequency of the oscillation signal varies with the process gain and time constants, respectively. The amplitude variations of the oscillation signal are used to maintain the overall system gain constant and the frequency variations are used to control the integral time constant of the control system in a sense to compensate for variations in the process time constants.

---

This invention relates to self-adaptive control systems. A self-adaptive control system generally comprises a control loop including a controller having a first control member and a control amplifying member in series with a process to be controlled. The control system also comprises a feedback path which connects the output of the process to an input of the control amplifying member of the controller, which acts as a limiter. The feedback path forms, together with the limiter acting as a control amplifier and the process, an auxiliary loop which is proportioned so that an oscillation signal occurs in it having an amplitude which varies upon variations of the process gain. The oscillation signal controls the control gain of the control amplifying member in a manner such that the product of the process gain and the control gain is substantially constant. Such self-adaptive control systems are known and may include P-controls, PI-controls or PID-controls.

Control systems of this type are discussed in greater detail in an article in the IEEE Transactions On Automatic Control, April 1963, titled "On Limit Cycling Control Systems," by A. Gelb and W. E. Vander Velde. Other prior art process controllers illustrating various combinations of proportional control, integral control, and derivative compensation can be found in U.S. Patents 2,830,245; 2,495,844; 2,974,272; 3,322,982, and in an article in "Instruments," vol. 24, June 1951, at pages 642–646.

To obtain satisfactory control, a controller must be matched to the process to be controlled by adjusting 1, 2 or 3 parameters respectively. This adjustment must be made each time again by the user for any desired variation in a process. Since in practice the adjustment is effected at a suitable instant and is not often necessary, it does not cause greater problems to the user. The adjustment problem becomes quite different if variations in the properties of the process occur during the process at arbitrary instants. In this case continuous attention is required to provide optimum adaptation of the parameters during the process. Controllers of the above-mentioned kind are known in which adaptation of the P (proportional) parameter upon a variation in the process gain is effected automatically by the use of said auxiliary loop. The amplitude of the oscillation signal which is produced in the auxiliary loop and which itself varies upon variation in the process gain then controls the control gain so that the product of the process gain and the control gain remains substantially constant. Controllers which operate on the PI-principle i.e. the so called proportional-integral controllers are frequently used in practice. The desired automatic adjustment of the P-parameter is then insufficient to compensate for variations in the time delay of the process, which may occur simultaneously or not, with variations in the process gain. Adjustment of the I (integral) parameter is then necessary in order to keep the whole system operating under optimum conditions. If use is made of a PID-control, it is, in addition, desirable that not only the P- and I-parameters be adjusted but also the D (differential) parameter.

An object of the invention is to provide a simple device in which the desired adaptation of the I- and D-parameters is obtained automatically. To this end, the control system according to the invention is characterized in that the auxiliary loop is connected to the first control member of the controller, the frequency of the oscillation signal in the auixliary loop determining the adjustment of the first control member. In this device use has been made of the recognition that the frequency of the oscillation in the auxiliary loop is determined by the phase shift in the feedback coupling which connects the output of the process to the input of the limiter. If no phase shift, or a phase shift which is constant for any frequency, is permissible in the feedback lead, the oscillation frequency is a measure of the delay time of the process. The adjustment of the I-parameter may thus advantageously be made dependent upon this frequency. Therefore, when any variation of the time constants of the process takes place, the oscillation frequency varies and the controller adjusts its integral time constant to a new value determined thereby. The adjustment of the I-parameter, as a function of this frequency, may be effected in a simple manner by connecting the integrator used for the I-control to the input signal periodically instead of continuously. The cycle period is then determined by the frequency of the oscillation signal, while the time during which the integrator is connected to the input signal is constant and determined, for example, by the switching time of a monostable multivibrator. The integral part of the controller thus operates in a discontinuous manner with the overall result that the effective integration time constant depends on the frequency at which the multivibrator switch is actuated. In the case of a PID-control, a D-parameter may likewise be adjusted by making it dependent upon the frequency of the oscillation signal since the D-parameter usually has a fixed relationship to the I-parameter.

In order that the invention may be readily carried into effect it will now be described in detail, by way of example, with reference to the accompanying diagrammatic drawing.

The sole figure shows a control system loop 1 comprising a controller, which includes a first control member 2 and a control amplifying member 3 which acts. as a limiter, a process 4 to be controlled and a feedback path coupling the output to the input. A command input or setpoint signal is applied to input terminal 12. As described in the Gelb et al. article referred to above, the input signal is usually a DC signal or a low frequency sinusoidal signal. As in all feedback systems, the output of the system is compared with the input to the system and the difference between the input and output is then used to drive the system so as to minimize the difference. Continuous adjustment of the P and I parameters are provided in the control loop 1. A feedback coup'ing 5 connects the output of the process 4 to an input of the control amplifying member 3 and forms, in combination with the process 4, an auxiliary loop 6. According to the invention, the auxiliary loop 6 is connected to the first control member 2 through a lead 7 and, in this example, via a pulse-producing network 8 and a monostable multivibrator 9 and via a switching device S. The feedback path 5 also includes a filtering network 10 and an amplifying device 11. In the control member 2, the P (proportional) control member is designated 2a. The I (integrating) control member or the I.D. (integrating-differentiating) control member is designated 2b.

In the auxiliary loop 6, the amplification factor is given a value such that an oscillation continually occurs. This oscillation is limited in amplitude and maintained stable due to the non-linear character of the limiter amplifier 3. The properties of the limiter 3 and the feedback coupling 5 are to be adjusted so that the oscillation signal produced at the output of controller is so small that it does not interfere with the process 4.

Variation in the process gain of the controlled process 4 causes a variation in amplitude of the oscillation signal produced which in turn varies the effective gain of the limiter 3 in the opposite sense. The loop gain for the oscillation signal remains constant. The limiter gain 3 is matched to the variations in process gain for the frequencies of the oscillation signal as well as for other frequencies, for example, signal frequencies of setpoint signals which may be applied to the input of the controller. In this manner the known method of adaptation of the P-parameter in the control system as previously mentioned is obtained. According to the invention use is made of the recognition previously referred to that the frequency of the oscillation in the auxiliary loop is a measure of the delay time of the process 4. The adaptation of the I-parameter (or the I and D) parameters in the case of a P.I.D. control) is thus determined by said frequency. To obtain this adaptation, the auxiliary loop 6 is connected through the lead 7 to the I- (or I.D.) control member 2b of the first control member 2. To ensure that the I-parameter (or I.D.-parameters) linearly follows the oscillation frequency in a simplified manner, the oscillation signal is preferably applied to the monostable multivibrator 9 via the pulse-producing network 8. The multivibrator 9 controls the switching device S, which may be, for example, an electronic switch. The I- (or I.D.) control member is thus connected periodically, dependent upon the oscillation frequency, to the input of the control system during fixed periods determined by the switching time of the monostable multivibrator.

The auxiliary loop 6 may also include the network 10 which has the characteristic of a high-pass filter. This network serves to prevent feedback coupling for low frequency signals. It may also ensure that the amplitude of the oscillation signal is small so that the aforementioned possible interference with the process 4 by the oscillation signal does not occur.

What is claimed is:

1. A self-adaptive control system comprising a control loop including a controller having a first control member and a control amplifying member in series with a process to be controlled, feedback coupling means connecting the output of the controlled process to an input of the control amplifying member operating as a limiter, the feedback coupling forming, together with the limiter amplifying member and the controlled process, an auxiliary loop which is proportioned so that an oscillation signal circulates therein having an amplitude which varies with variations of the process gain, said oscillation signal controlling the control gain of the control amplifying member in a sense such that the product of the process gain and the control gain is substantially constant, and means connecting the auxiliary loop to the first control member of the controller so that the frequency of the oscillation signal in the auxiliary loop controls the adjustment of the first control member.

2. A self-adjusting control system as claimed in claim 1 wherein said connecting means comprises, a pulse-producing network coupled to the auxiliary loop, a monostable multivibrator coupled to said pulse-producing network, a switching device connected between the input of the control system and the first control member, the multivibrator controlling said switching device so as to periodically connect the input of the control system to the first control member of the controller during fixed time periods.

3. A self-adjusting control system as claimed in claim 2, wherein the auxiliary loop includes a network having the characteristic of a high-pass filter.

4. A self-adaptive control system for a process to be controlled comprising, an input terminal for receiving a control signal and an output terminal, first control means, a limiting amplifier, means connecting said first control means, said limiting amplier and the controlled process in series between said input and output terminals, feedback coupling means connecting the output of the controlled process to the input of said limiting amplifier to form a self-oscillating auxiliary loop comprising said limiting amplifier, said controlled process and said feedback coupling means, the amplitude of the oscillation signal circulating in the auxiliary loop being determined by the process gain and the frequency thereof by the process time constants, said limiting amplifier being responsive to a variation in the amplitude of said oscillation signal to vary its gain in a sense to maintain constant the product of the process gain and the limiting amplifier gain, means for controlling the adjustment of the integral time constant of said first control means, and means for coupling the oscillation signal in said auxiliary loop to said integral controlling means so that the frequency of said oscillation signal controls the adjustment thereof.

5. A control system as claimed in claim 4 wherein said adjustment controlling means includes switching means controlled by said oscillation signal and said first control means comprises a proportional control member directly connected between the input terminal and the input of the limiting amplifier and an integral control member, and means connecting said switching means and said integral control member in series between said input terminal and the input of said limiting amplifier.

6. A control system as claimed in claim 5 wherein the frequency of said oscillation signal is higher than the frequency of said control signal, and said coupling means includes a high-pass filter network.

7. A control system as claimed in claim 5 wherein said adjustment controlling means further comprises a multivibrator controlled by said oscillation signal and controlling in turn said switching means so that the integral control member is connected periodically to said input terminal in accordance with the oscillation frequency.

8. A control system as claimed in claim 4 further comprising a feedback path connecting said output terminal to said input terminal.

References Cited

UNITED STATES PATENTS

| | | | |
|---|---|---|---|
| 1,931,660 | 10/1933 | Kautter | 330–137 X |
| 3,258,711 | 6/1966 | Searl et al. | 330—137 |
| 3,322,982 | 5/1967 | Craiglow et al. | 331—69 X |

ROY LAKE, Primary Examiner

J. B. MULLINS, Assistant Examiner

U.S. Cl. X.R.

318—28